(12) United States Patent
Hsueh-Feng

(10) Patent No.: US 7,293,758 B2
(45) Date of Patent: Nov. 13, 2007

(54) PIPE CONNECTOR

(76) Inventor: Lai Chang Hsueh-Feng, P.O. Box 36-80, Taichung City (TW)

( * ) Notice: Subject to any disclaimer, the term of this patent is extended or adjusted under 35 U.S.C. 154(b) by 77 days.

(21) Appl. No.: 11/372,871

(22) Filed: Mar. 10, 2006

(65) Prior Publication Data

US 2007/0210273 A1    Sep. 13, 2007

(51) Int. Cl.
*F16K 51/00*    (2006.01)
*F16L 29/00*    (2006.01)
*F16L 37/28*    (2006.01)

(52) U.S. Cl. .............................. 251/149.7; 251/149.6; 285/316; 285/323

(58) Field of Classification Search ............ 251/149.1, 251/149.6, 149.7, 148; 285/316, 317, 322, 285/323
See application file for complete search history.

(56) References Cited

U.S. PATENT DOCUMENTS

| | | | | |
|---|---|---|---|---|
| 5,181,751 A | * | 1/1993 | Kitamura | 285/39 |
| 5,653,480 A | * | 8/1997 | Mine et al. | 285/322 |
| 5,716,081 A | * | 2/1998 | Leigh-Monstevens et al. | 285/319 |
| 6,283,443 B1 | * | 9/2001 | Taneya | 251/149.6 |
| 6,893,051 B1 | * | 5/2005 | Park et al. | 285/104 |

* cited by examiner

*Primary Examiner*—Eric Keasel
*Assistant Examiner*—John K. Fristoe, Jr.
(74) *Attorney, Agent, or Firm*—Charles E. Baxley

(57) ABSTRACT

A pipe connector includes a casing, a valve block mounted in the first end of the casing and movable between a close position and an open position and normally supported in the close position by a spring inside the casing, a locking block holder mounted in the second end of the casing and movable between a locking position and an unlocking position and normally supported in the locking position by a spring inside the casing, and locking blocks transversely mounted in the locking block holder and movable with the locking block holder along a tapered inside all portion of the casing to lock/unlock a pipe that is inserted into the locking block holder to move the valve block to the open position.

14 Claims, 5 Drawing Sheets

PIPE CONNECTOR

BACKGROUND OF THE INVENTION

1. Field of the Invention

The present invention relates to pipe connector and more particularly, to such a pipe connector, which allows quick mounting/dismounting of the pipe without any tools.

2. Description of the Related Art

Pipes and pipe connectors are commonly used for delivering a flow of gas or fluid. A pipe connector to which the invention pertains is adapted to receive a rigid pipe. According to conventional designs, a tool must be used to fasten tight the pipe connector after insertion of the pipe into the pipe connector, or to unfasten the pipe connector when wishing to disconnect the pipe from the pipe connector. It takes much time to fasten tight or unfasten the pipe connector. Further, when fasten the pipe connector excessively tight, the parts of the pipe connector or the pipe may be damaged accidentally. Further, before disconnecting the pipe from the pipe connector, the worker must turn off the flow source and empty the pipe. However, the worker may spend a lot of time to find the location of the main valve of the flow source.

SUMMARY OF THE INVENTION

The present invention has been accomplished under the circumstances in view. It is the main object of the present invention to provide a pipe connector, which automatically locks the pipe without any supplementary tools. It is another object of the present invention to provide a pipe connector, which allows quick disconnection of the pipe without any supplementary tools. It is still another object of the present invention to provide a pipe connector, which automatically blocks the passage after removal of the pipe. To achieve these and other objects of the present invention, the pipe connector comprises a cylindrical casing, the cylindrical casing having an accommodation open chamber longitudinally extending through two distal ends thereof, the accommodation open chamber having a first end and a second end; a valve block mounted in the first end of the accommodation open chamber and axially movable from between a close position and an open position, the valve block having at least one input port and at least one output port, the at least one output port being closed when the valve block is in the close position, the at least one output port being opened when the valve block is in the open position; a locking block holder mounted in the second end of the accommodation open chamber and axially movable between a locking position and an unlocking position, the locking block holder having a center through hole for receiving a pipe; a plurality of locking blocks respectively transversely movably mounted in the locking block holder, the locking blocks each having an engagement face, the engagement face of each of the locking blocks being respectively forced into the center through hole of the locking block holder to engage the pipe being inserted into the center through hole of the locking block holder when the locking block holder is in the locking position, the engagement face of each of the locking blocks being respectively disengaged from the pipe being inserted into the center through hole of the locking block holder when the locking block holder is in the unlocking position; and a sealing structure mounted in the accommodation open chamber between the valve block and the locking block holder, the sealing structure defining a center opening for receiving the pipe that is inserted into the center through hole of the locking block holder.

DETAILED DESCRIPTION OF THE PREFERRED EMBODIMENT

Figure 3:
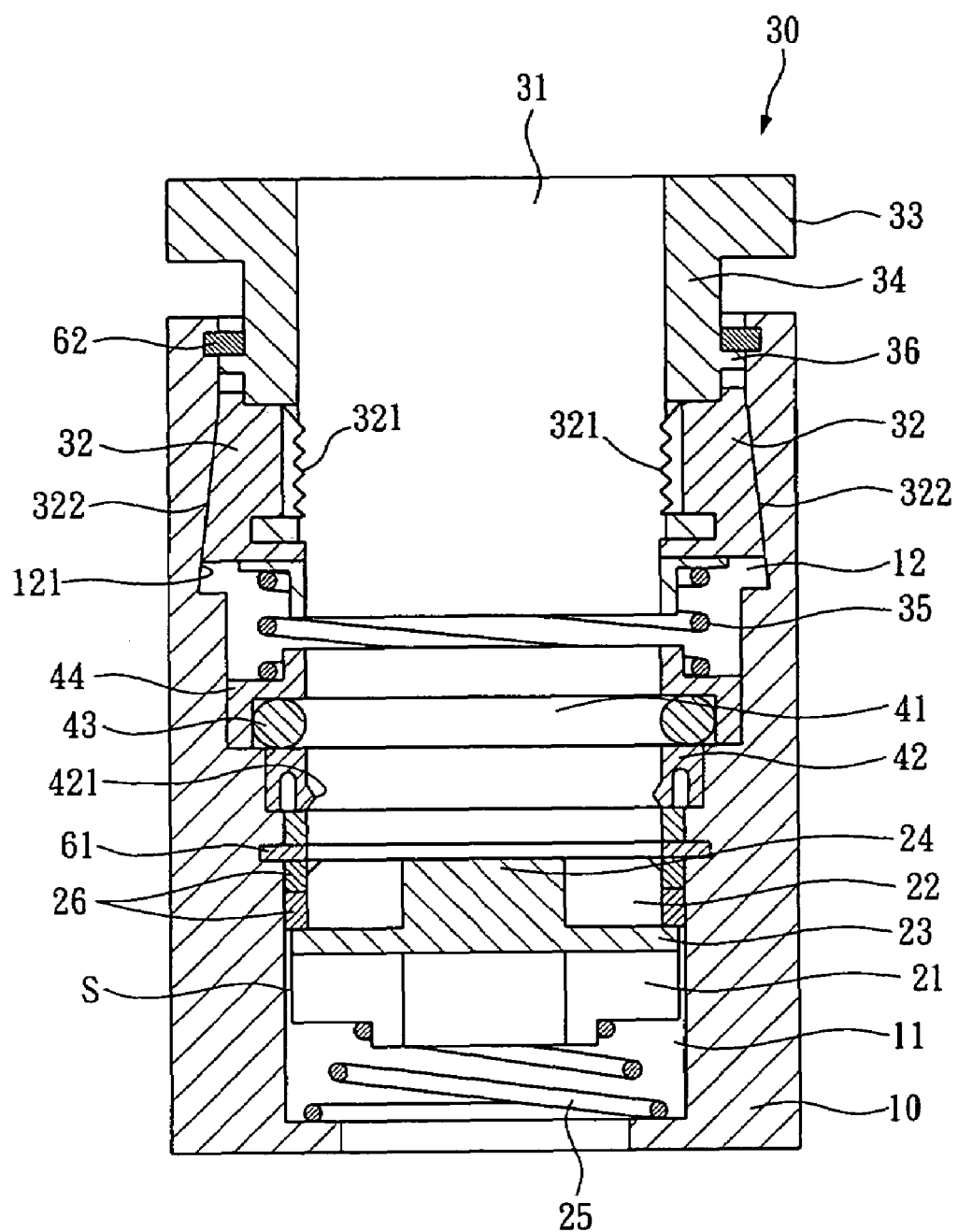
FIG. 3 is a sectional view taken in an enlarged scale along line 3-3 of FIG. 2.

Referring to FIG. 3, a pipe connector in accordance with the present invention is shown comprising:

a cylindrical casing 10, which has an accommodation open chamber 11 longitudinally extending through two distal ends thereof;

a valve block 20, which is mounted in one end, namely, the first end of the accommodation open chamber 11 inside the cylindrical casing 10 and normally positioned in a close position (see FIG. 3) and axially movable from the close position (see FIG. 3) to an open position (see FIG. 4), having at least one input port 21 and at least one output port 22, which output port 22 is closed when the valve block 20 is in the close position or opened when the valve block is in the open position;

a locking block holder 30, which is mounted in the other end, namely, the second end of the accommodation open chamber 11 of the casing 10 and normally set in a locking position (see FIG. 3) and axially movable from the locking position (see FIG. 3) to an unlocking position (see FIG. 5), having a center through hole 31 for receiving a pipe;

a plurality of locking blocks 32 respectively transversely movably mounted in the locking block holder 30, each locking block 32 having an engagement face 321, which is forced into the center through hole 31 of the locking block holder 30 when the locking block holder 30 is in the locking position or forced out of the center through hole 31 of the locking block holder 30 when the locking block holder 30 is in the unlocking position; and a sealing structure 40, which is mounted in the accommodation open chamber 11 of the casing 10 between the valve block 20 and the locking block holder 30, defining a center opening 41 for receiving the pipe that is inserted into the center through hole 31 of the locking block holder 30.

When a pipe 50 is inserted with one end thereof into the center through hole 31 of the locking block holder 30 and the center opening 41 of the sealing structure 40, the pipe 50 pushes the valve block 20 from the close position to the open position, and the locking block holder 30 is moved to the locking position where the engagement face 321 of each locking block 32 is forced into the center through hole 31 of the locking block holder 30 and kept engaged with the periphery of the pipe 50 to lock the pipe 50 to the casing 10. Therefore, the flow of air or fluid (not shown) is allowed to pass through the output port 22 of the valve block 20 into the pipe 50. At the same time, the sealing structure 40 is tightly secured to the periphery of the pipe 50 to prevent leaking of the flow of air or fluid out of the pipe 50.

Further, when applied an external force to move the locking block holder 30 from the locking position to the unlocking position to disengage the locking blocks 32 from the pipe 50, the pipe 50 can easily be removed from the pipe connector.

Figure 1:
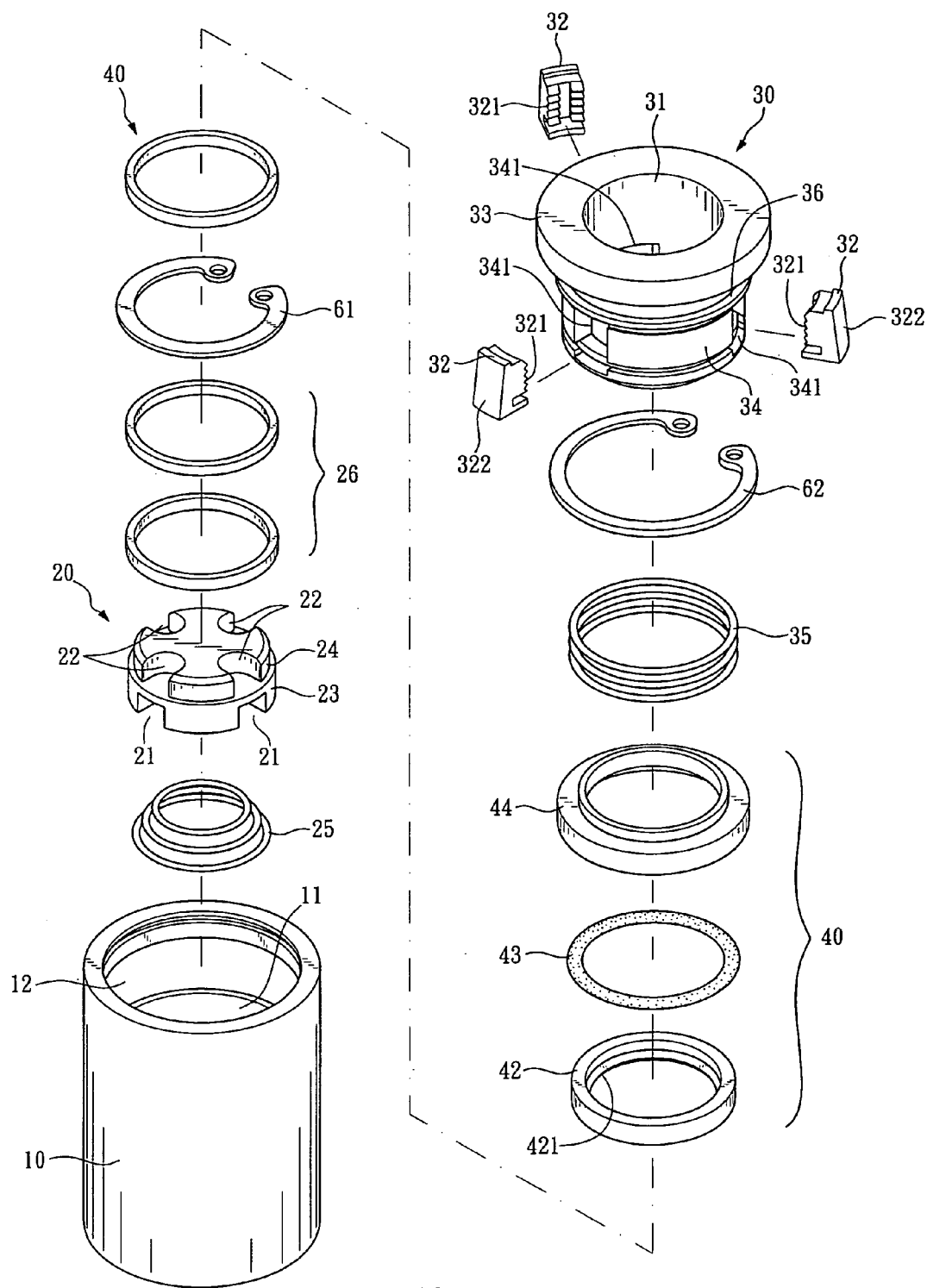
FIG. 1 is an exploded view of a pipe connector according to the present invention.
Figure 2:
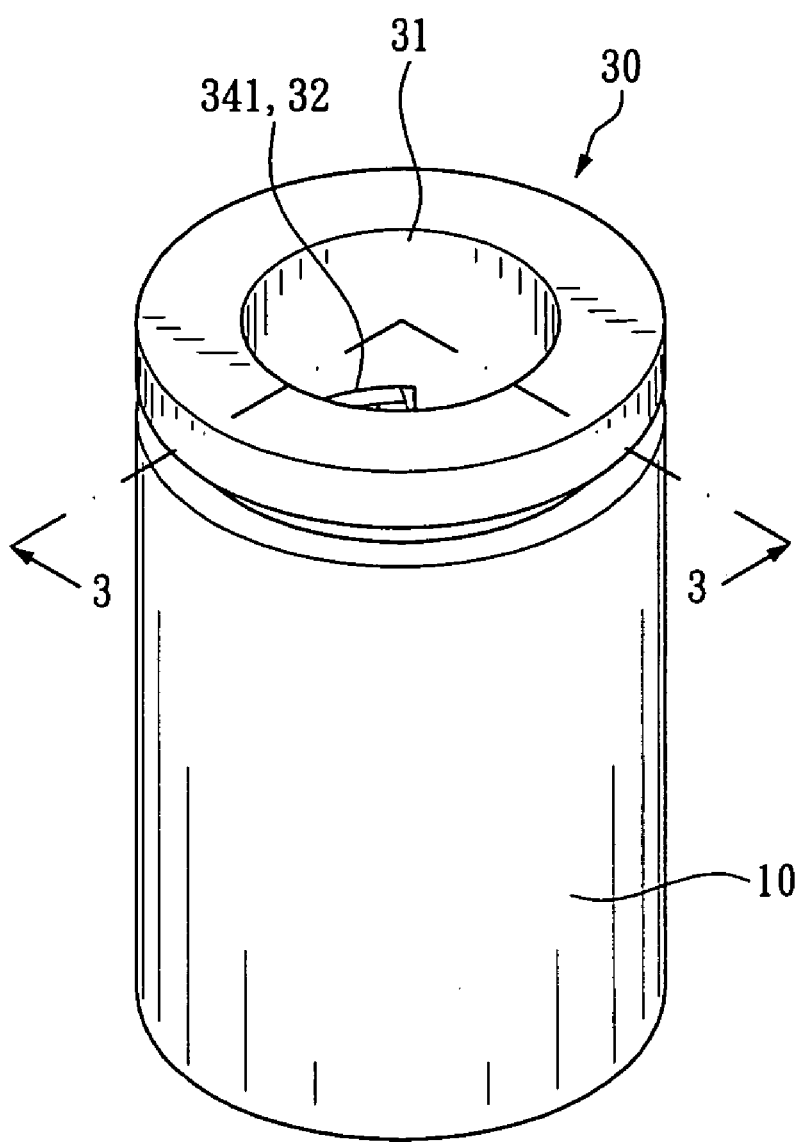
FIG. 2 is an elevational assembly view of the pipe connector according to the present invention.

Referring to FIGS. 1~3, the valve block 20 has a base 23 and a shaft 24 formed integral with one side of the base 23. The diameter of the shaft 24 is smaller than the base 23. The shaft 24 has a plurality of grooves, configuring the output ports 22. The base 23 has input ports 21 formed therein. The outer diameter of the base 23 is smaller than the diameter of the accommodation open chamber 11 of the casing 10 such that a gap "s" is defined between the inner diameter of the casing 10 and the outer diameter of the base 23 and disposed in communication between the input ports 21 and the output ports 22. A spring member 25 is set between the valve block 20 and the first end of the casing 10. Gasket rings 26 are mounted in the casing 10 above the valve block 20. The spring member 25 imparts a pressure to the valve block 20, holding the valve block 20 against the gasket rings 26 (i.e., the aforesaid close position). At this time, the gasket rings 26 seal the passage between the input ports 21 and the output ports 22, and the flow of air or fluid cannot pass from the input ports 21 to the output ports 22.

The locking block holder 30 has a hollow cylindrical holder body 34 and a rim 33 at the top side of the hollow cylindrical holder body 34. The hollow cylindrical holder body 34 is inserted into the casing 10, keeping the rim 33 outside the casing 10 and spaced from the second end of the casing 10 a distance. The hollow cylindrical holder body 34 has a plurality of openings 341 equiangularly spaced around the periphery in communication with the center through hole 31 for accommodating the locking blocks 32, and an outside annular flange 36 extending around the periphery above the openings 341. Each locking block 32 has a sloping outside wall 322. The engagement face 321 of each locking block 32 is a toothed face formed on the inner side opposite to the sloping outside wall 322. The casing 10 has a tapered inside wall portion 121, which defines with the second end of the accommodation open chamber 11 a conical space 12 within which the locking blocks 32 are moved between the locking position and the unlocking position. The sloping outside wall 322 of each locking block 32 is kept in close contact with the tapered inside wall portion 121 of the casing 10. Further, a spring member 35 is mounted inside the casing 10 and stopped between the sealing structure 40 and the locking block holder 30, supporting the locking block holder 30 in the locking position.

The sealing structure 40 is comprised of a holding down ring 42, a seal ring 43, and a sealing cap 44. The tightening up ring 42, the seal ring 43 and the sealing cap 44 are set in the accommodation open chamber 11 of the casing 10 in proper order, defining the aforesaid center opening 41. The spring member 35 is set between the sealing cap 44 and the locking block holder 30. The holding down ring 42 has an inside annular flange 421.

Further, two C-shaped retainers 61 and 62 are respectively fastened to the inside wall of the accommodation open chamber 11 of the casing 10. One C-shaped retainer 61 is set between the valve block 20 and the sealing structure 40 to support the holding down ring 42. The other C-shaped retainer 62 is secured to the second end of the accommodation open chamber 11 of the casing 10 for stopping against the outside annular flange 36 of the locking block holder 30 to prohibit the locking block holder 30 from falling out of the casing 10.

Figure 4:
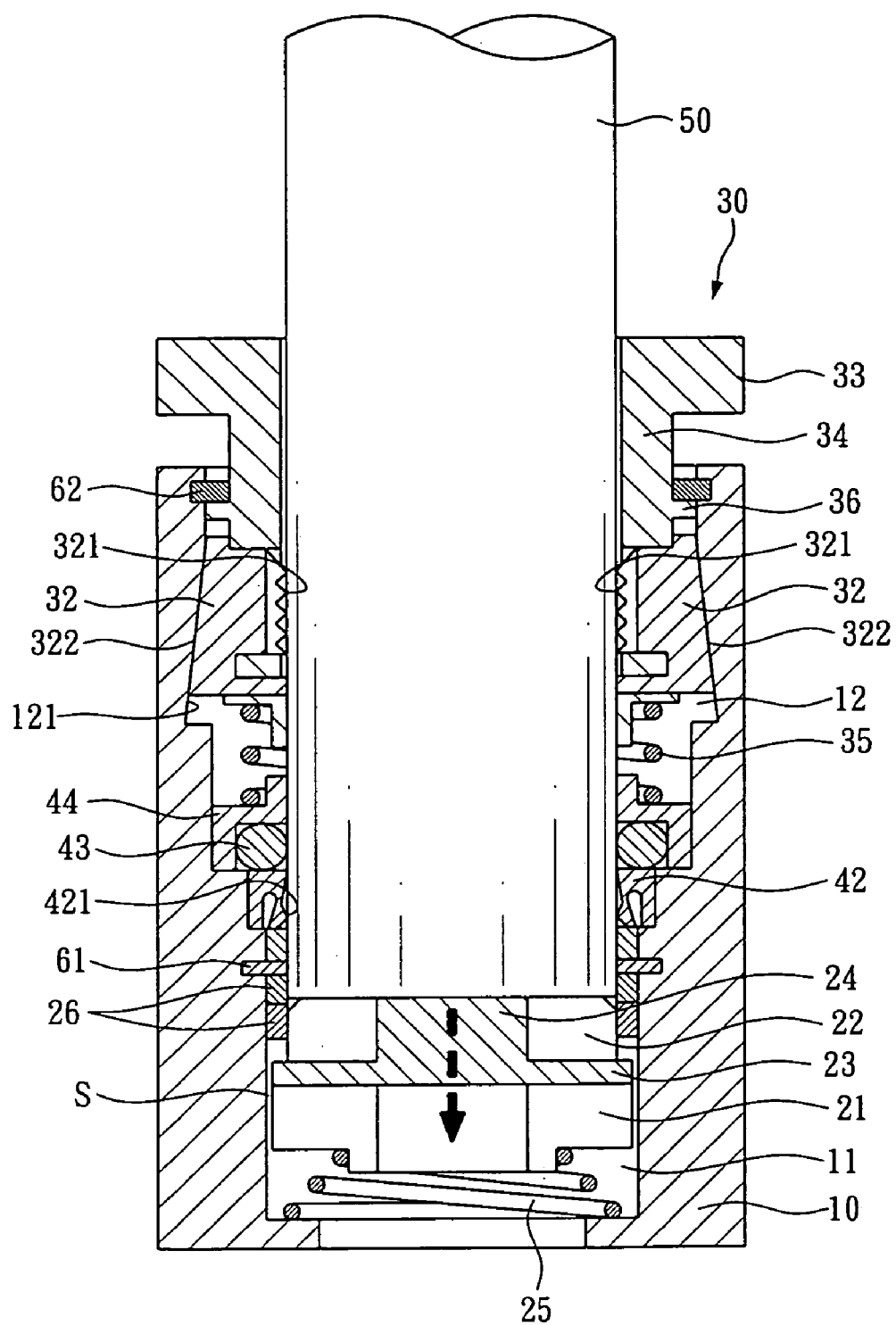
FIG. 4 is a schematic sectional view showing the pipe connector connected to a pipe according to the present invention.

Referring to FIG. 4, when one end of the pipe 50 is inserted into the center through hole 31 of the locking block holder 30 and the center opening 41 of the sealing structure 40 and stopped against the valve block 20, the valve block 20 is forced to compress the spring member 25 and moved away from the gasket rings 26 to the open position for allowing the flow of air or fluid to pass from the input ports 21 through the gap "s" to the inside of the pipe 50 via the output ports 22. The sealing structure 40 and the pipe 50 are tightly secured together, and the inside annular flange 421 of the holding down ring 42 is compressed against the outside wall of the pipe 50 to prevent a leakage. Further, the locking block holder 30 is forced by the spring member 35 outwards relative to the casing 10 from the unlocking position to the locking position, causing the locking blocks 32 to be forced transversely inwards toward the center through hole 31 of the locking block holder 30 by the tapered inside wall portion 121, and therefore the toothed engagement face 321 of each locking block 32 is forced into engagement with the periphery of the pipe 50 to lock the pipe 50 to the casing 10.

Figure 5:
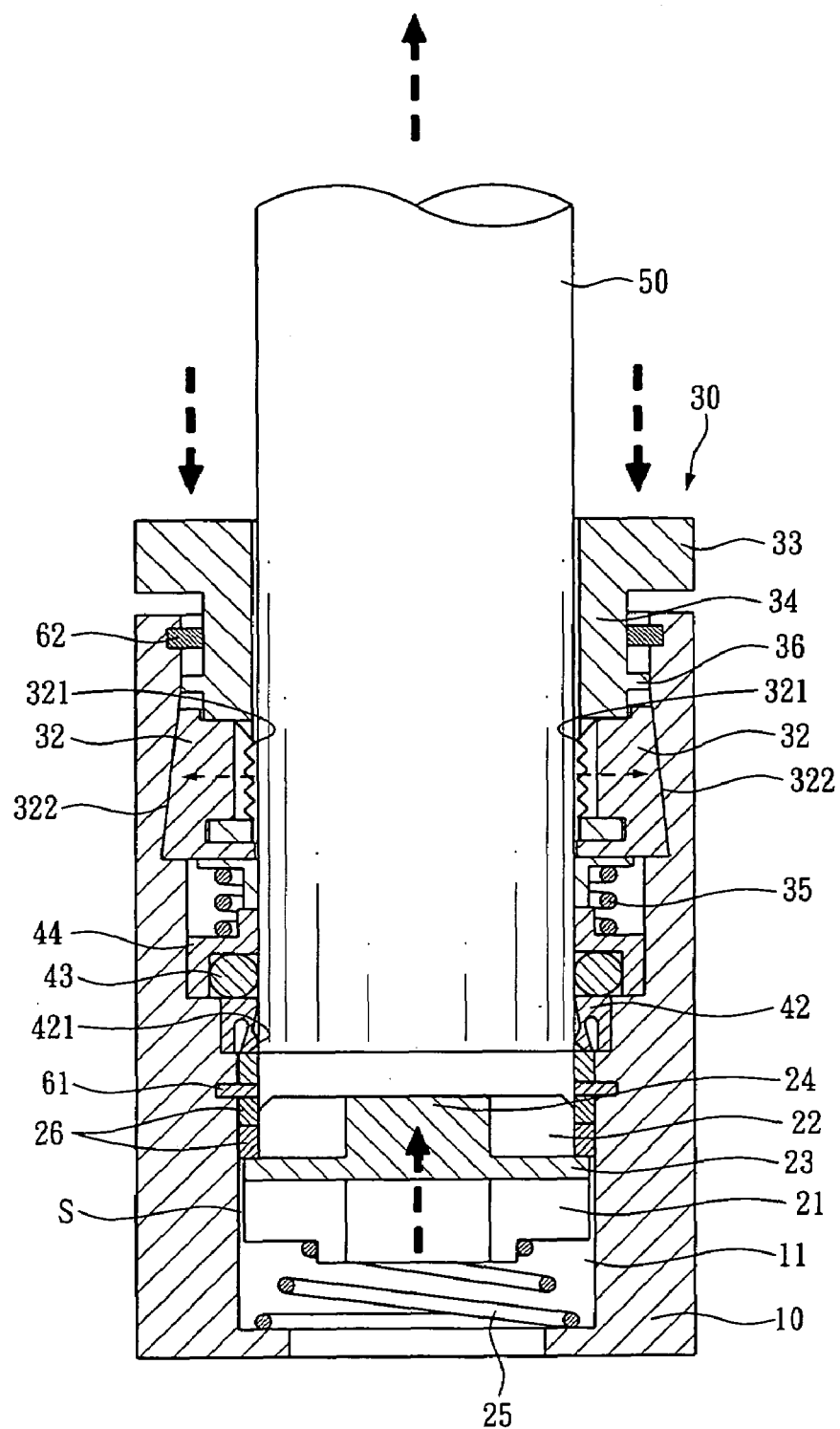
FIG. 5 is a schematic sectional view showing the separation action of the pipe connector from the pipe according to the present invention.

Referring to FIG. 5, when applied an external force to press the rim 33 of the locking block holder 30 toward the casing 10 to compress the spring member 35 (i.e., from the locking position toward the unlocking position), the gradually increasing conical space 12 releases the pressure from the locking blocks 32, allowing the pipe 50 to be removed from the locking block holder 30. After removal of the pipe 50 from the locking block holder 30, the spring member 25 immediately returns the valve block 20, forcing the base 23 of the valve block 20 against the gasket rings 26, and therefore the output ports 22 are blocked.

As shown in FIGS. 4 and 5, when the pipe 50 is disconnected from the pipe connector, the pipe connector is closed. On the contrary, when the pipe 50 is installed in the pipe connector, the pipe connector is opened, allowing the flow of air or fluid to flow into the pipe 50. In actual practice, the pipe 50 is kept away from the valve block 20 at the beginning when one end of the pipe 50 is inserted into the locking block holder 30, and the pipe 50 is pushed forwards to move the valve block 20 to the close position after installation of the piping. The invention does not need any supplementary tool when mounting or dismounting the pipe.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A pipe connector comprising:
   a cylindrical casing, said cylindrical casing having an accommodation open chamber longitudinally extending through two distal ends thereof, said accommodation open chamber having a first end and a second end;
   a valve block mounted in the first end of said accommodation open chamber and axially movable from between a close position and an open position, said valve block having at least one input port and at least one output port, said at least one output port being closed when said valve block is in said close position, said at least one output port being opened when said valve block is in said open position;
   a locking block holder mounted in the second end of said accommodation open chamber and axially movable between a locking position and an unlocking position, said locking block holder having a center through hole for receiving a pipe;

a plurality of locking blocks respectively transversely movably mounted in said locking block holder, said locking blocks each having an engagement face, the engagement face of each of said locking blocks being respectively forced into the center through hole of said locking block holder to engage the pipe being inserted into the center through hole of said locking block holder when said locking block holder is in said locking position, the engagement face of each of said locking blocks being respectively disengaged from the pipe being inserted into the center through hole of said locking block holder when said locking block holder is in said unlocking position; and a sealing structure mounted in said accommodation open chamber between said valve block and said locking block holder, said sealing structure defining a center opening for receiving the pipe that is inserted into the center through hole of said locking block holder.

2. The pipe connector as claimed in claim 1, wherein said valve block has a base and a shaft formed integral with one side of said base; said at least one output port is respectively formed on said shaft; said at least one input port is respectively formed on said base.

3. The pipe connector as claimed in claim 2, further comprising at least one gasket ring mounted in said accommodation open chamber and adapted to block the passage between said at least one input port and said at least one output port when said valve block is moved to said close position.

4. The pipe connector as claimed in claim 2, further comprising a spring member mounted inside said cylindrical casing and stopped between the first end of said accommodation open chamber and said base of said valve block to support said valve block in said close position.

5. The pipe connector as claimed in claim 1, wherein said locking block holder has a hollow cylindrical holder body and a rim at a top side of said hollow cylindrical holder body, said hollow cylindrical holder body being inserted into the second end of said accommodation open chamber, said rim being kept outside said cylindrical casing, said hollow cylindrical holder body having a plurality of openings equiangularly spaced around the periphery thereof in communication with the center through hole of said locking block holder for accommodating said locking block.

6. The pipe connector as claimed in claim 5, wherein the engagement face of each of said locking blocks is toothed.

7. The pipe connector as claimed in claim 6, wherein said locking blocks each have a sloping outside wall disposed at an outer side opposite to the respective engagement face; said casing has a tapered inside wall portion, which defines with the second end of said accommodation open chamber a conical space within which said locking blocks are moved between said locking position and said unlocking position.

8. The pipe connector as claimed in claim 5, further comprising a spring member set between said locking block holder and said sealing structure to support said locking block holder in said locking position.

9. The pipe connector as claimed in claim 1, wherein said sealing structure comprises a holding down ring, a seal ring, and a sealing cap set in proper order in said accommodation open chamber.

10. The pipe connector as claimed in claim 9, wherein said holding down ring has an inside annular flange for stopping against the periphery of the pipe, which is inserted into the center through hole of said locking block holder.

11. A pipe connector comprising:

a cylindrical casing, said cylindrical casing having an accommodation open chamber longitudinally extending through two distal ends thereof, said accommodation open chamber having a first end and a second end, and a tapered inside wall portion defined defining with the second end of said accommodation open chamber a conical space;

a valve block mounted in the first end of said accommodation open chamber and axially movable from between a close position and an open position, said valve block having a base, at least one input port formed on said base, a shaft extending from one side of said base, and at least one output port formed on said shaft in communication with said at least one input port;

a first spring member stopped between said base of said valve block and the first end of said accommodation open chamber to support said valve block in said close position;

at least one gasket ring mounted inside said accommodation open chamber around said shaft of said valve block;

a locking block holder mounted in the second end of said accommodation open chamber and axially movable between a locking position and an unlocking position, said locking block holder having a hollow cylindrical holder body, a rim at a top side of said hollow cylindrical holder body, and a center through hole surrounded by said hollow cylindrical holder body said rim for receiving a pipe, said hollow cylindrical holder body being inserted into the second end of said accommodation open chamber, said rim being kept outside said cylindrical casing, said hollow cylindrical holder body having a plurality of openings equiangularly spaced around the periphery thereof in communication with the center through hole of said locking block holder for accommodating said locking block;

a plurality of locking blocks respectively transversely movably mounted in the openings of said locking block holder and movable with said locking block holder within said conical space, said locking blocks each having an engagement face disposed at an inner side and a sloping outer wall disposed at an outer side in contact with the tapered inside wall portion of said cylindrical casing, the engagement face of each of said locking blocks being respectively forced into the center through hole of said locking block holder to engage the pipe being inserted into the center through hole of said locking block holder when said locking block holder is in said locking position, the engagement face of each of said locking blocks being respectively disengaged from the pipe being inserted into the center through hole of said locking block holder when said locking block holder is in said unlocking position;

a sealing structure mounted in said accommodation open chamber between said valve block and said locking block holder, said sealing structure defining a center opening for receiving the pipe that is inserted into the center through hole of said locking block holder; and a second spring member stopped between said sealing structure and said hollow cylindrical holder body of said locking block holder to support said locking block holder in said locking position.

12. The pipe connector as claimed in claim 11, wherein said engagement face of each of said locking blocks is toothed.

13. The pipe connector as claimed in claim 11, wherein said sealing structure comprises a holding down ring, a seal ring, and a sealing cap set in proper order in said accommodation open chamber.

14. The pipe connector as claimed in claim 13, wherein said holding down ring has an inside annular flange for stopping against the periphery of the pipe, which is inserted into the center through hole of said locking block holder.

* * * * *